United States Patent [19]

Hegler et al.

[11] 4,303,104

[45] Dec. 1, 1981

[54] DOUBLE-WALL PLASTIC TUBING IN WHICH THE OUTER WALL HAS TRANSVERSE CORRUGATIONS AND THE INNER WALL IS SMOOTH

[75] Inventors: Wilhelm Hegler, Goethe Str. 2, Bad Kissingen, Fed. Rep. of Germany, 873; Ralph-Peter Hegler, Bad Kissingen, Fed. Rep. of Germany

[73] Assignee: Wilhelm Hegler, Fed. Rep. of Germany

[21] Appl. No.: 155,899

[22] Filed: Jun. 2, 1980

Related U.S. Application Data

[60] Continuation of Ser. No. 967,807, Dec. 8, 1978, abandoned, which is a division of Ser. No. 823,778, Aug. 11, 1977, Pat. No. 4,145,387.

[30] Foreign Application Priority Data

Aug. 24, 1976 [DE] Fed. Rep. of Germany ....... 2637995

[51] Int. Cl.³ .............................................. F16L 11/06
[52] U.S. Cl. ..................................... 138/121; 138/148; 138/173; 138/178
[58] Field of Search ............... 138/103, 121, 122, 148, 138/137, 140, 172, 173, 178; 405/49; 239/542, 547

[56] References Cited

U.S. PATENT DOCUMENTS

| | | | |
|---|---|---|---|
| 2,898,941 | 8/1959 | Kilcup | 138/121 |
| 3,330,303 | 7/1967 | Fochler | 138/121 X |
| 3,461,531 | 8/1969 | De Gain | 405/49 X |
| 3,559,692 | 2/1971 | Montelet | 138/121 |
| 3,753,352 | 8/1973 | McNally | 138/178 X |
| 3,756,902 | 9/1973 | Konecry et al. | 138/148 X |
| 3,837,364 | 9/1974 | Jenner | 138/122 |
| 3,861,152 | 1/1975 | Maroschak | 405/49 |
| 4,010,298 | 3/1977 | Angle | 138/103 X |
| 4,037,626 | 7/1977 | Roberts | 138/121 X |

Primary Examiner—James E. Bryant, III
Attorney, Agent, or Firm—Sprung, Felfe, Horn, Lynch & Kramer

[57] ABSTRACT

In the manufacture of double-wall plastic tubing in which the outer wall has transverse corrugations and the inner wall is smooth, in the case of annular transverse corrugations the air pressure between the two walls cannot be balanced with the external air pressure, resulting in deformations of the inner tube. To permit an equilibrium of pressure before the inner wall hardens, openings are pierced in the outer wall or openings are produced between the two walls for communication between the inner chambers of the transverse corrugations. After the hardening of the inner tube, these openings are reclosed by fusion.

5 Claims, 14 Drawing Figures

FIG. 11
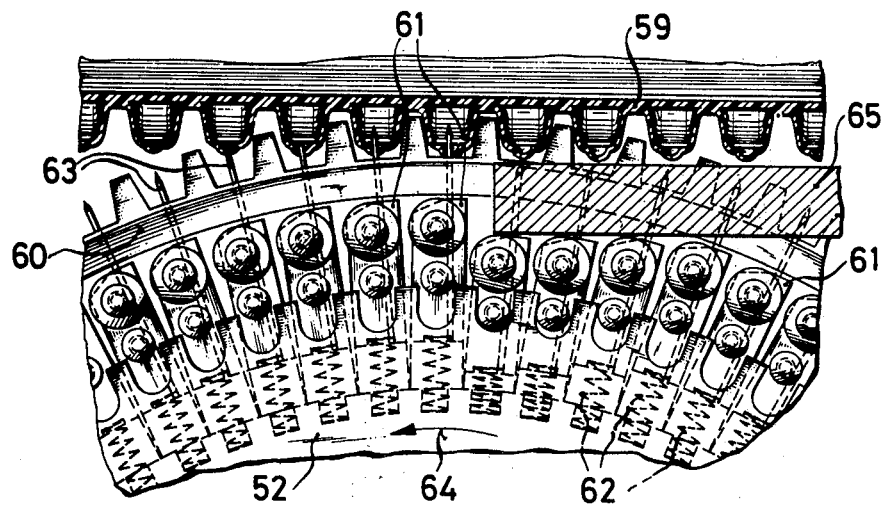
FIG. 12
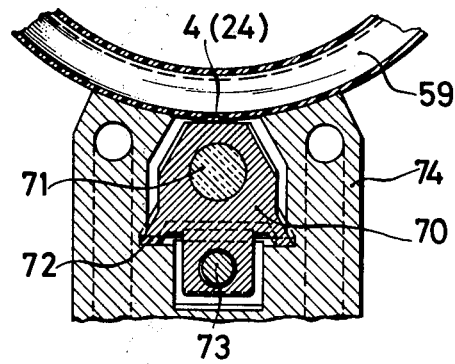
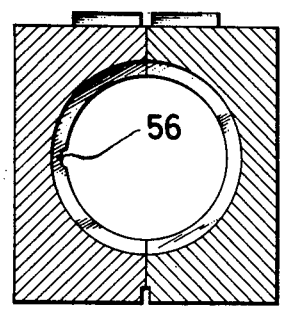
FIG. 13
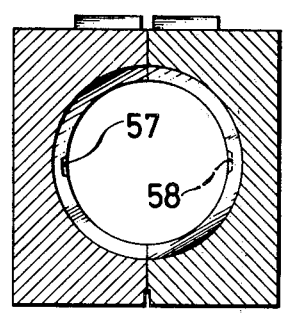
FIG. 14

4,303,104

DOUBLE-WALL PLASTIC TUBING IN WHICH THE OUTER WALL HAS TRANSVERSE CORRUGATIONS AND THE INNER WALL IS SMOOTH

This is a continuation of application Ser. No. 967,807, filed Dec. 8, 1978, now abandoned, which is a division of application Ser. No. 823,778, filed Aug. 11, 1977, now U.S. Pat. No. 4,145,387, issued Mar. 20, 1979.

BACKGROUND OF THE INVENTION

Field of the Invention

This invention relates to a method of making double-walled plastic tubing in which the outer wall has transverse corrugations and the inner wall is smooth, the transverse corrugations being produced by means of recirculating molds.

DISCUSSION OF PRIOR ART

It is known to produce such tubing by extruding two tubes from concentrically disposed annular dies, the outer tube being carried between two oppositely circulating sets of half molds which join together along a path to form the whole molds and which are provided with depressions and elevations corresponding to the transverse corrugations, and the heat-softened tube being made to conform to the molds by a pressure difference. The tube extruded from the inner annular die is introduced into this outer tube provided with the said transverse corrugations, and is brought into engagement with the outer tube by a pressure medium, so that the two tubes can be fused together.

In this method, to enable the inner tube to have a smooth surface and prevent it from bulging inwardly or outwardly, preheated air having a slight excess pressure is introduced into the space between the two tubes and into the interior of the inner tube. A pressure equilibrium then establishes itself during the cooling of the outer tube. The practice of this known method presents no difficulty when the transverse corrugations of the outer tube are helical corrugations and thus form an uninterrupted passage whereby the air pressure within this passage can balance out so that no overpressure or underpressure develops.

The situation changes when the transverse corrugations of the outer tube are not helical but full circular corrugations. In this case an equilibrium of pressure is no longer possible after the inner tube has been welded in place. Double-wall tubing with circular transverse corrugations, however, are preferred in all cases where special value is placed on the avoidance of leaks in the tube couplings and the attachment of branches. In the case of tubes with helical corrugations, care must be taken at the tube ends and at branches to see that the passage is carefully sealed between the two tubes. In tubes having annular corrugations, this is not necessary because each of the annular passages is sealed off, so to speak, from the adjacent passage.

The production of such tubes with annular corrugations presents considerable difficulty, because the air pressure within the annular corrugations changes during the cooling process. In the fabrication of polyolefin chlorides, especially polyvinyl chloride, these difficulties can be overcome by introducing air at elevated temperature and elevated pressure into the space between the two tubes. Upon cooling, the air pressure within the annular passages decreases, but the pressure reduction can be kept within such limits that, upon further cooling, the pressure difference will not be so great as to draw the inner tube into the annular passages. In the fabrication of polyolefins, such as polyethylene or polypropylene, or polyamides and other such high polymers, substantially greater difficulties are involved. Polyolefins, however, have the advantage over the polyolefin chlorides that they are easy to weld and have greater resistance to cold. Furthermore, polyolefins when burned do not pollute the environment, whereas the burning of polyvinyl chlorides produces hydrochloric acid. The difficulties are to be attributed above all to the fact that the fabricating temperatures of the polyolefins are considerably higher than those of the polyolefin chlorides. Accordingly, the volume reduction of the air entrapped in the circular channels is considerably greater than in the case of the polyolefin chlorides and can no longer be compensated by introducing air at higher pressure into the space between the two tubes. In addition, the polyolefins have a low thermal conductivity. If the outer, corrugated tube is cooled, the heat can escape outwardly from the inner tube only through the weld seams, i.e., the inner tube remains plastically deformable for a long time after the solidification of the outer tube.

THE INVENTION

All these difficulties are overcome in tubes whose outer wall has annular transverse corrugations by producing in the outer wall or between the two walls openings which connect the interiors of the transverse corrugations to one another or to the exterior and which are closed by fusion after the inner tube has cooled.

If openings are produced whereby the adjacent annular corrugations communicate with one another, the same situation exists as in the case of tubes having helical transverse corrugations. However, to avoid the disadvantages of the latter tubes, the communication openings must afterwards be closed, and this presents difficulties if the adjacent transverse corrugations are connected to one another by the openings.

According to the further invention, therefore, the openings are pierced from the outside. In this manner, each individual annular chamber is in communication with the outside atmosphere and, when the air within the annular chamber cools, air can enter from the outside, so that a depression is avoided. To be able to reclose the pierced openings after the cooling of the tube, it is desirable, by means of depressions in the molds, to form corresponding, nipple-like projections on the annular ribs, into which the openings are pierced. By means of fusion with a hot tool or ultrasonic fusion, the openings in the projections can be closed, the projections being pressed flat and thereby made to conform to the rest of the profile.

The piercing of the openings is performed as the tube emerges from the train of molds. The openings, however, can also be pierced within the mold train. For this purpose, bores can be provided in the molds whose size matches the thickness of the needles for the piercing of the openings. During the formation of the tube, these needles are in a position wherein their points still do not extend into the cavity of the molds. As soon as the outside wall is sufficiently stable in shape, preferably shortly before the mold train opens, the needles are then pushed through outside guiding members into the outer wall and withdrawn.

When the tube leaves the mold train and while it is being further cooled, a depression establishes itself within the annular corrugations, so that air flows into the annular corrugations through the pierced openings. Not only air is thus admitted into the corrugation cavity, but also high atmospheric moisture and also, under certain circumstances, water which is used for the cooling of the outer tube. If this mixture of air and water strikes the outside of the inner tube, the latter is deformed by evaporation and undesirable inward bulges are formed in the inside wall, which not only look unattractive but also reduce the usefulness of the tubing because they increase its resistance to flow. It has been found that such damage can be prevented by piercing the openings into the wall portions which are vertical or nearly vertical in the forming of the tube, i.e., they are pierced from the side, so that when the air enters, any water droplets it may entrain will not impinge upon the inside wall opposite the opening, but will drop downwardly into the annular chamber where they will spread out and evaporate.

This invention is also directed to a double-walled plastic tube made by the method of the invention, whose outer wall has annular transverse corrugations and whose inner wall is smooth, and in which the outer tube wall has nipple-like projections which have been pierced and the holes have been reclosed by fusion. In such tubes the scars where such fusion was performed can be seen, as is not the case in tubes which have not been made by the method of the invention. In particular, the invention relates to a double-walled plastic tube of polyolefins or polyamides having a coarse profile, i.e., tubes in which the height and width of the corrugations amount to, say, 8 to 12% of the inside diameter; for example, in a tube of an inside diameter of 100 mm, the outside diameter of the corrugations amounts to 120 mm.

BRIEF DESCRIPTION OF THE DRAWINGS

Embodiments which explain the invention are represented to FIGS. 1 to 9. FIGS. 10 to 14 illustrate the process and apparatus employed therefor.

FIG. 10 shows schematically a complete production installation for the production of double-wall tubes;

FIG. 11 shows a sector of this installation;

FIG. 12 shows a cut according to line XII—XII through the welder;

FIGS. 13 and 14 show various embodiments of molds.

DESCRIPTION OF SPECIFIC EMBODIMENTS

Figure 1:
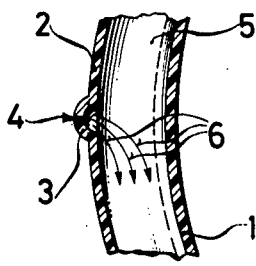
FIG. 1 is a cross-sectional view taken through a portion of a tube with an opening made by piercing.
Figure 2:
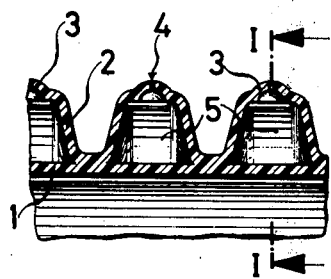
FIG. 2 is a horizontal cross section taken through the same tube.
Figure 3:
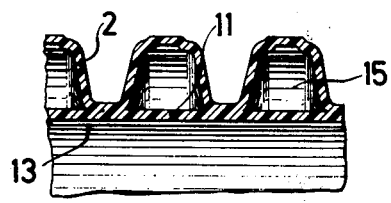
FIG. 3 shows the same longitudinal section with the openings fused shut.

The tube of FIGS. 1 to 3 consists of the smooth inner tube 1 and the outer tube 2 formed into annular transverse corrugations. Through an appropriate configuration of the molds, projections 3 are formed on the annular corrugations of the outer tube 3 at portions which stand vertically upon the emergence of the tube from the old train, i.e., the annular cavity 5 between the inner tube 1 and the outer tube 2 is vertical at this point. Openings 4 are pierced in the projections 3, very small openings of a few tenths of a millimeter sufficing to assure pressure compensation. If droplets of water are entrained by the air entering through the openings 4, they will fall, as indicated by the arrows 6 in FIG. 1, into the annular cavity which is vertical or virtually vertical at this point, where they will evaporate without causing any damage.

Figure 4:
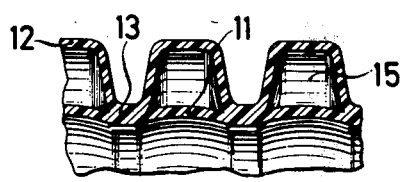
FIG. 4 shows a known double-wall tube to explain the deformation due to pressure.

The pressureconditions on a tube in which no pressure equalization openings are present are indicated in FIG. 4.

In the mold train the outer tube 12 is cooled to such an extent that its shape is stable. Since the inner tube 11 can yield its heat only through the narrow heat bridges 13 at which the outer and inner tubes are welded together, the inner tube has still not cooled sufficiently to have a stable shape, but is still in a heat-softened state. To remove the heat from the inner tube as well, the outer tube must be intensively cooled; this can be done by carrying the tube through a water bath or spraying it with water.

The air in the annular cavity 15, which had a temperature of over 200° C. corresponding to the softening temperature of the plastic when the two tubes were fused together, then cools to about room temperature. Even if supporting air at a pressure of 1.2 atmospheres has been introduced, a vacuum of about 0.4 atmosphere will result in annular cavity 15 after cooling down to room temperature, and this pressure difference will force the still heat-softened inner tube, as represented, into the annular corrugations of the outer tube, so that the inside of the tube will not be smooth as desired, but will itself have annular ribs which very appreciably increase its resistance to flow.

In the subject of the invention, however, the pressure can reach an equilibrium with the external air pressure through the openings made by piercing, i.e., as soon as the openings are pierced, no vacuum or overpressure will be produced in the annular cavities, and the inner wall will be able to harden without any bulging, as represented in FIGS. 2 and 3. In addition, any slight inward or outward bulging that may have formed prior to the piercing of the openings due to the shrinking tendency of the heat-softened plastic will also be compensated.

Figure 6:
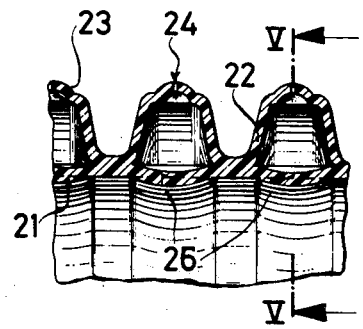
FIG. 6 shows a vertical longitudinal section taken through the tube of FIG. 5.
Figure 5:
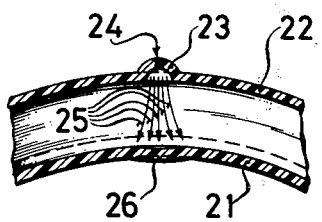
FIG. 5 shows a cross-section taken through a portion of a tube with an opening made by piercing.

FIGS. 5 and 6 indicate the undesirable effect that can be produced if the openings are pierced vertically downward into the tube. The tube represented in FIGS. 5 and 6 again consists of an inner tube 21 and an outer tube 22 on which projections 23 are formed, into which the pressure equalizing openings 24 are pierced. If in this case water droplets are entrained by the inflowing air, they will fall, as indicated by the arrows 25, on the outer surface of the inner tube 21 opposite the opening 24. Here the droplets of water will evaporate and produce a strong cooling effect and hence a deformation of the inner wall, which then will have unattractive bulges 26 at these points, which will increase the resistance to flow.

Figure 7:
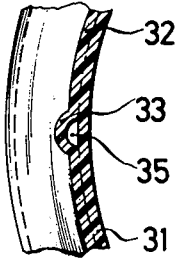
FIG. 7 shows a cross section taken through a portion of a tube with connecting openings between adjacent circular corrugations.
Figure 8:
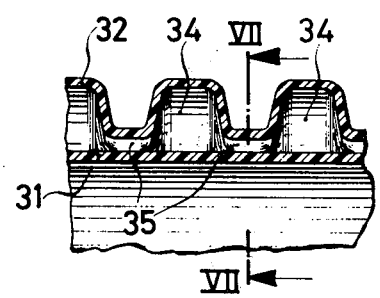
FIG. 8 shows a partial longitudinal section taken through the tube of FIG. 7.

Instead of piercing the openings from the outside, projections 33 can be produced on the inner corrugations during the forming of the outer tubes, as shown in FIGS. 7 and 8. If the inner tube 31 is then forced against the corrugated outer tube 32, passages 35 will remain open at these points between the individual annular chambers 34, so that the individual annular chambers will be in communication with one another. Consequently, the pressure between the annular chambers can equalize itself, so that in this case, too, no deformation of the inner wall takes place. Afterwards, after the outer and inner tube have hardened, the communicating passages 35 can be closed by pressing the projections 33 flat with a tool heated to the softening temperature. This method has the advantage that no scars will be visible on the outer ribs. The closing of the passages 35, however, is not as easy to accomplish as the closing of the air inlet openings 4 and 24.

Figure 9:
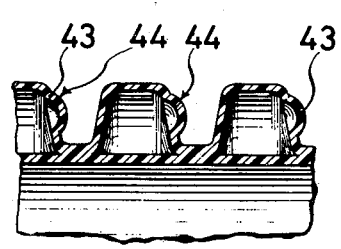
FIG. 9 shows a partial longitudinal section taken through a tube having projections formed laterally on the corrugations.

To avoid scars on the outer circumference of the annular ribs, the projections 43, as indicated in FIG. 9, can also be formed laterally on the annular ribs. The pressure equalizing openings 44 can in this case be pierced into the projections at an angle from above.

Figure 10:
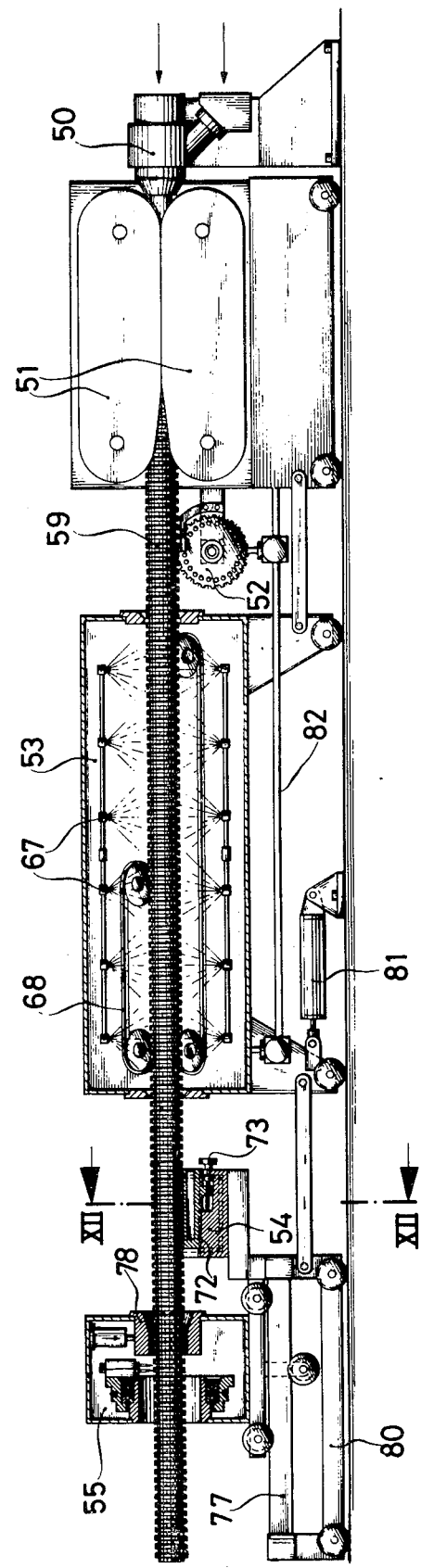

The production plant shown in FIG. 10 consists of a double spraying head 50 which, for instance, can be an extruder head according to U.S. Pat. No. 3,994,644, the disclosure of which is hereby incorporated specifically herein by reference, of a forming machine 51, which can be an apparatus according to U.S. Pat. No. 3,776,679, whose disclosure is also specifically incorporated herein by reference, or any other known forming machine for the production of plastic tubes with transverse corrugations, the device 52 for the piercing of the holes into the outer tube, a cooling system 53, the welding device 54 lfor the welding of the openings produced by the device 52 and a separating device 55.

The shaping machine 51 contains, as shown schematically, two mold trains with molds conducted in the circular course, which produce the transverse corrugations of the outer tube. FIGS. 13 and 14 show cross sectional cuts through molds of the mold train for the production of a tube where, according to FIGS. 7 and 8, the hollow spaces of adjacent ribs are in connection with one another through channels 35. For this purpose, as shown in FIG. 13, the projecting ribs have openings 56 in the mold. FIG. 14 shows another embodiment of the molds wherein on the one side only every second rib has an opening 57, whereas in the other mold half the intermediate ribs have openings 58. In both cases it is attained that at the place of the hole the outer tube is not pressed onto the inner tube so that the adjacent cavities remain connected through a passage 35 (FIG. 7). After the cooling of the tubes these channels can be heated by a simple device and pressed together.

The tube 59 consisting of an outer tube provided with annular transverse corrugations and an inner, smooth tube leaves the shaping machine 51 in a condition where the outer tube is sufficiently cooled at least on its outer side that it can no longer be plastically deformed, whereas the inner tube still has a substantially higher temperature. Since by the higher temperature of the inner tube the outer tube would again be heated to softening, the tube 59 must be led into the cooling device 53 as quickly as possible. Between the shaping machine 51 and the cooling device 53 there is the perforator 52, whose effective portion is shown enlarged in FIG. 11. This device contains a cogwheel 60 which is driven synchronously with the shaping machine 51 so that its teeth interlock into the corrugations of the tube 59. In this cogwheel there are plungers 61 radially movable which are pressed outwardly by the springs 62. On each plunger there is mounted a pin 63. During the rotation of the cogwheel in the direction of the arrow 64, the plungers are pressed inwardly by a tension ridge 65. At the end of the tension ridge 65 which is closely in front of the vertex of the cogwheel 60, the plungers are set free and move rapidly forward by the effect of the tight springs 62, an opening being pierced in each case by the pin 63 into the ribs of the tube 53. During the subsequent movement of the tube and the cogwheel the pins are again extracted from the tube. Through this opening, the inner pressure within the hollow spaces of the ribs between the outer and the inner tube can adjust to the atmospheric pressure. Preferably, the apparatus 52 is not arranged below the tube 59 as shown, but at the side of the tube staggered by 90° against the drawing plane so that the openings are not pierced from below but from the side, as explained above with reference to FIG. 1.

Adjacent to the device 52, the tube enters the cooling device 43 where it is sprayed with cold water from all sides by means of the nozzles 67. This cooling device is depicted in abridged form in FIG. 10. In case of tubes with larger dimensions, there are required cooling devices which are three to five times as long as the forming machine 51. In the cooling device there are arranged conveyor belts 68 which are also actuated synchronously with the device 51 and do not only have the purpose of moving the tube 59 through the cooling device, but also insure that during the cooling the tube is not submitted to form changes through undesired shrinkage of the cooling plastic.

The tube 49 leaves the cooling device 53 in a condition in which the inner tube is also sufficiently cooled so that form changes no longer have to be suspected. Now the tube 59 reaches the welding device 54 by which the holes in the warts are welded closed. This welding device must, of course, be in the same position as the perforator 52. This welding device contains a welding prism 70 (FIG. 12) which is heated to the required temperature by means of a heating device 71 and which is beveled onto the tube 59 too strongly so that the welding heat only acts on the tube within the region of the warts 4 or 24. By means of this welding device, the opening pierced by the device 52 is again closed. The welding prism 70 lies longitudinally movable on an inclined plane 72 (FIG. 10) and can be moved on same by means of the spindle 73 in order to allow the exact adjustment of the distance of the welding prism 70 from the tube 59. In order to protect the tube 59 beyond the region of the warts from the heat radiation of the welding prism 70, the same is surrounded by a water-cooled cover 74. After the openings in the warts are welded, the tube is finished and can be cut off in the device 55 in the lengths desired in each case.

The cutting device 55 moves on a path 77 and is taken along by the tube during the cutting of the tube by gripping devices 78 so that the sectional planes are exactly at right angle to the tube axis. Preferably, the welding device 54 and the cutting device 55 are arranged on a carriage 80 which can be moved by a hydraulic cylinder 81. The synchronous running of the perforator 52 and the conveyor belts 68 with the forming machine 51 is insured by the common main shaft 82.

The openings formed in the walls of the annular transverse corrugations or between adjacent corrugations generally have as the largest dimension a dimension in the range between 0.8 and 2.0 mm. Generally speaking, the openings are circular in cross section but can, of course, be oval, rectangular, square, triangular or any other shape.

What is claimed is:

1. A double-wall plastic tube whose outer tube has annular transverse corrugations and whose inner tube is smooth, said outer tube having wart-like elevations having an opening therethrough, said outer tube and said inner tube being fused together, prepared by a process comprising extruding two tubes from two concentrically disposed annular dies, the outer tube being carried between two oppositely circulating sets of mold halves which join together along their path to define whole molds, the molds being provided with annular depressions and elevations and the outer plastic tube being made to conform to the molds by a pressure differential whereby it obtains annular transverse corrugations and an inner tube is extruded from the inner annular die to engage and fuse to the outer tube by a pressure medium, said opening being formed in said outer tube, or between said inner tube and said outer tube before said inner tube has hardened, said opening communicating with the region defined between the wall of said annular corrugation and said inner tube with the next adjacent region defined by the wall of a next adjacent corrugation and said inner tube or with the exterior beyond said outer tube and thereafter cooling the double-walled tube to harden said inner tube.

2. A double-wall plastic tube according to claim 1 wherein said inner tube is a polyolefin or polyamide.

3. A double-wall plastic tube according to claim 2 wherein said inner tube is polyethylene or polypropylene.

4. A double-wall plastic tube according to claim 1 wherein the height and the wave length of the transverse corrugations of the outer wall amount to about 8 to 12% of the inside diameter.

5. A double-wall plastic tube whose outer tube has annular transverse corrugations and whose inner tube is smooth, said outer tube having sears on the outer circumference of the annular corrugations, prepared by a process wherein two tubes are extruded from two concentrically disposed annular dies, the outer tube being carried between two oppositely circulating sets of mold halves which join together along their path to define whole molds, the molds being provided with annular depressions and elevations and the outer plastic tube being made to conform to the molds by a pressure differential whereby it obtains annular transverse corrugations and an inner tube is extruded from the inner annular die to engage and fuse to the outer tube by a pressure medium, an opening being formed in said outer tube or between said inner tube and said outer tube before said inner tube has hardened, said opening communicating with the region defined between the wall of said annular corrugation and said inner tube with the next adjacent region defined by the wall of a next adjacent corrugation and said inner tube or with the exterior beyond said outer tube, thereafter cooling the double-wall tube to harden said inner tube and thereafter reclosing the opening by applying sufficient energy to fuse the same closed whereby to form said sears.

* * * * *